(No Model.)

M. BALLIN & F. HOFF.
COFFEE POT ATTACHMENT.

No. 294,347. Patented Mar. 4, 1884.

WITNESSES:
Jos. M. Rosenbaum
Otto Risch

INVENTOR
Moritz Ballin
and Franz Hoff
BY Goepel & Raegener
ATTORNEYS.

UNITED STATES PATENT OFFICE.

MORITZ BALLIN, OF NEW YORK, AND FRANZ HOFF, OF BROOKLYN, N. Y.

COFFEE-POT ATTACHMENT.

SPECIFICATION forming part of Letters Patent No. 294,347, dated March 4, 1884.

Application filed June 28, 1883. (No model.)

*To all whom it may concern:*

Be it known that we, MORITZ BALLIN, of the city, county, and State of New York, and FRANZ HOFF, of Brooklyn, county of Kings, and State of New York, have invented certain new and useful Improvements in Coffee-Pot Attachments, of which the following is a specification.

In the preparation of coffee a considerable portion of the aroma or flavor has been allowed to escape into the air, which is shown by the strong odor of coffee that becomes perceptible when the decoction is made.

The object of this invention is to prevent the escape of the aroma entirely while the coffee is being prepared; and the invention consists of an attachment to coffee-pots, formed of a funnel, the spout of which terminates in a cup which extends above the orifice of said spout, so as to form a hydraulic seal when the water is poured in.

Figure 1:
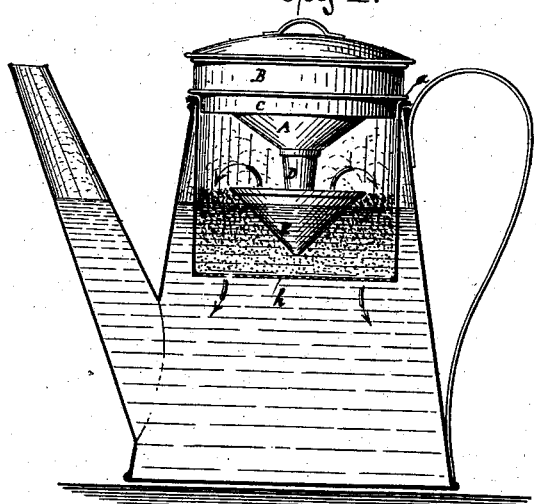
Figure 2:
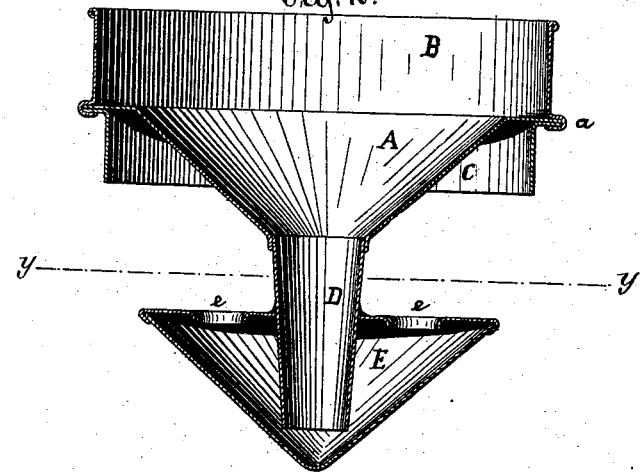
Figure 3:
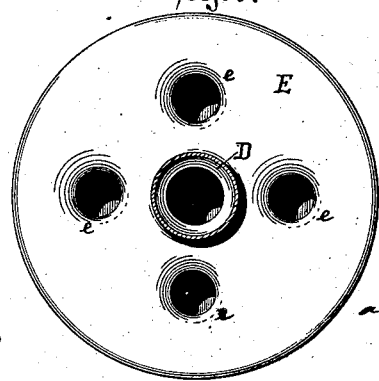

In the accompanying drawings, Figure 1 shows a vertical central section of a coffee-pot with our improved attachment. Fig. 2 represents a vertical transverse section. Fig. 3 is a horizontal section of the same on line $y\ y$, Fig. 2.

Similar letters of reference indicate the corresponding parts.

Referring to the drawings, A is a funnel, at the upper edge of which is arranged a cylindrical part, B. A smaller cylinder, C, is extended below said edge, and made to fit into the strainer of the coffee-machine, being supported thereon by the projecting rim $a$. The lower part of the funnel A consists of a spout, D, the lower part of which is surrounded by a cup, E, of conical, cylindrical, or other shape, which is made of sheet metal and attached to the spout of the funnel A. The boiling water poured into the funnel is enabled to pass, after the cup E is filled, over the edge or through perforations $e\ e$ in the top plate of the same into the strainer. Thus the cup E, in connection with the funnel-spout D, constitutes a hydraulic seal, which prevents the escape of the aroma of the coffee in the machine. The ground coffee is contained in a strainer, $h$, which extends around the funnel and its hydraulic seal. The strainer is supported in the coffee-pot by its overlapping rim. The cylindrical part C of the funnel A is placed into the strainer until its rim $a$ rests upon the latter. Boiling water is poured through the funnel, forms a hydraulic seal in cup E, and then passes through the orifices $e\ e$, through the ground coffee and the strainer, the decoction of coffee finally collecting, in the usual manner, in the lower part of the coffee-pot.

The attachment is made in sizes to fit any coffee-pot, with which and the strainer it forms a coffee-machine. It furnishes thereby a coffee-machine that makes a good coffee, containing all the aroma of the beans, even to persons of moderate means, as only the purchase of the cheap attachment is required.

Having thus described our invention, we claim as new and desire to secure by Letters Patent—

1. An improved attachment for coffee-pots, consisting of a funnel, A, the spout of which is surrounded by a cup, E, extending above the orifice of the spout, so as to form a hydraulic seal, substantially as set forth.

2. An attachment for coffee-pots, consisting of a funnel, A, having a rimmed cylindrical portion, B C, at its upper part, and a cup, E, extending around the lower part of spout D, and forming a hydraulic seal therewith, substantially as set forth.

3. The combination of a coffee-pot and strainer with a funnel seated at its upper part in the coffee-pot, and provided at the lower end of its spout with a cup that extends above the orifice of the spout and forms a hydraulic seal therewith, substantially as specified.

In testimony that we claim the foregoing as our invention we have signed our names in presence of two subscribing witnesses.

MORITZ BALLIN.
FRANZ HOFF.

Witnesses:
PAUL GOEPEL,
SIDNEY MANN.